US008596843B2

(12) United States Patent
Murakawa

(10) Patent No.: US 8,596,843 B2
(45) Date of Patent: Dec. 3, 2013

(54) VEHICLE HEADLAMP

(75) Inventor: Kazuhiro Murakawa, Isehara (JP)

(73) Assignee: Ichikoh Industries, Ltd., Isehara-shi (JP)

( * ) Notice: Subject to any disclaimer, the term of this patent is extended or adjusted under 35 U.S.C. 154(b) by 0 days.

(21) Appl. No.: 13/461,007

(22) Filed: May 1, 2012

(65) Prior Publication Data

US 2012/0287660 A1 Nov. 15, 2012

(30) Foreign Application Priority Data

May 11, 2011 (JP) ................................ 2011-106598

(51) Int. Cl.
*B60Q 1/00* (2006.01)

(52) U.S. Cl.
USPC ............................ 362/539; 362/351; 362/520

(58) Field of Classification Search
USPC ......... 362/520, 521, 522, 538, 539, 507, 518, 362/299, 351
See application file for complete search history.

(56) References Cited

U.S. PATENT DOCUMENTS 7,201,505 B2 * 4/2007 Sugimoto et al. ............. 362/539
7,315,127 B2 * 1/2008 Tajima ............................ 315/82
7,350,948 B2 * 4/2008 Nino et al. .................... 362/539
7,866,863 B2 * 1/2011 Tanaka .......................... 362/518
7,959,336 B2 * 6/2011 Iwasaki ......................... 362/517
7,972,046 B2 * 7/2011 Iwasaki ......................... 362/517
8,287,167 B2 * 10/2012 Inaba ............................ 362/539
2007/0147062 A1 * 6/2007 Nino et al. .................... 362/538

FOREIGN PATENT DOCUMENTS

JP 2008-021463 A 1/2008

* cited by examiner

*Primary Examiner* — John A Ward
(74) *Attorney, Agent, or Firm* — Foley & Lardner LLP

(57) ABSTRACT

An object of the present invention is to control light distribution so that light is distributed to a predetermined point while a light distribution pattern for overhead is transversely spread. The present invention includes a discharge lamp, a reflector, a projection lens, a shade, and a reflection member. At a window portion of the shade, edges, are provided for forming cutoff lines CL1, CL2, and CL3. The reflection member is disposed between the projection lens and the shade. At the reflection member, recessed reflection surfaces are provided for transversely spreading a light distribution pattern OSP for overhead sign. As a result, the present invention is capable of controlling light distribution so that light is distributed to a predetermined point in a state in which the light distribution pattern OSP for overhead sign is transversely spread.

2 Claims, 10 Drawing Sheets

VEHICLE HEADLAMP

CROSS-REFERENCE TO RELATED APPLICATIONS

This application claims priority of Japanese Patent Application No. 2011-106598 filed on May 11, 2011. The contents of this application are incorporated herein by reference in their entirety.

BACKGROUND OF THE INVENTION

1. Field of the Invention

The present invention relates to a vehicle headlamp of projector type, which is adapted to emit a light distribution pattern having one or more cutoff lines and a light distribution pattern for overhead sign, forward of a vehicle.

2. Description of the Related Art

A vehicle headlamp of such projector type is conventionally known (for example, Japanese Unexamined Patent Application Publication No. 2008-21463). Hereinafter, a conventional vehicle headlamp will be described. The conventional vehicle headlamp is a headlamp in which part of reflection light from a reflector is shaded by means of a shade, a light distribution pattern having cutoff lines is formed by means of the remaining reflection light having passed through the shade, and part of the remaining reflection light having passed through the shade is reflected on a light reception face for overhead sign to thereby form a light distribution pattern for overhead sign.

In the light distribution pattern for overhead sign, which is emitted from such a vehicle headlamp of projection type, it is necessary that light be distributed to a predetermined point in a state in which the light is transversely spread.

As described above, in such a vehicle headlamp of projection type, there is a problem that it is necessary that light be distributed to a predetermined point in a state in which the light is transversely spread.

The present invention has been made in order to solve the above-described problem that it is necessary that light be distributed to a predetermined point in a state in which the light is transversely spread.

SUMMARY OF THE INVENTION

According to a first aspect of the present invention, a vehicle headlamp of projection type is provided, and includes: a light source; a reflector having a reflection surface adapted to reflect light from the light source; a projection lens adapted to forwardly project reflection light from the reflection surface; a shade having a window portion, adapted to shade part of the reflection light from the reflection surface to thereby form the light distribution pattern having the cutoff line by means of remaining reflection light; and a reflection member adapted to reflect part of the reflection light having passed through the window portion to thereby form the light distribution pattern for the overhead sign, wherein at least one edge adapted to form the cutoff line is provided at the window portion, the reflection member is disposed between the projection lens and the shade, and a recessed reflection surface is provided for transversely spreading the light distribution pattern for the overhead sign.

According to a second aspect of the present invention, a vehicle headlamp of projection type is provided, wherein the at least one edge includes: a first horizontal edge adapted to form a horizontal cutoff line on an opposite lane side; a second horizontal edge which is positioned to be lower than the first horizontal edge, and is adapted to form a horizontal cutoff line on a cruising lane side; and a central oblique edge adapted to form a central oblique cutoff line, the recessed reflection surface is formed in a shape recessed to a lower side, and has: a first recessed reflection surface adapted to reflect light having passed through the window portion on a side of the first horizontal edge to thereby form a portion on the opposite lane side; a second recessed reflection surface adapted to reflect light having passed through the window portion on a side of the second horizontal edge to thereby form a portion on the cruising lane side; and a third recessed reflection surface adapted to reflect light having passed through the window portion on a side of the central oblique edge to thereby form a central connecting portion, and an area of the second recessed reflection surface is smaller than an area of the first recessed reflection surface.

The vehicle headlamp according to the first aspect of the present invention is capable of transversely spreading a light distribution pattern for overhead sign by means of a recessed reflection surface of a reflection member, thus making it possible to control light distribution so that light is distributed to a predetermined point.

In the vehicle headlamp according to the second aspect of the present invention, an area of the second recessed reflection surface is smaller than an area of the first recessed reflection surface; and therefore, reflection light having passed through the window portion on the second horizontal edge side and reflected by the second recessed reflection surface onto the cruising lane side is less than reflection light having passed through the first horizontal edge side and reflected by the first recessed reflection surface onto the cruising lane side. However, the second horizontal edge is positioned to be lower than the first horizontal edge; and therefore, the light having passed through the window portion on the second horizontal edge side is more than the light having passed through the window portion on the first horizontal edge side. As a result, in the vehicle headlamp according to the second aspect of the present invention, the light having passed through the window portion on the first horizontal edge side (less light than the light having passed through the window portion on the second horizontal edge side) is reflected on the first recessed reflection surface to form a portion on an opposite lane side by means of the reflection light (more reflection light than the reflection light reflected on the second reflection surface), whereas the light having passed through the window portion on the second horizontal edge side (more light than the light having passed through the window portion on the first horizontal edge side) is reflected on the second recessed reflection surface to form a portion on the cruising lane side by means of the reflection light (less reflection light than the reflection light reflected on the first reflection surface), and the light having passed through the window portion on the central oblique edge side (more light than the light having passed through the window portion on the first horizontal edge side and less light than the light having passed through the window portion on the second horizontal edge side) is reflected on a third recessed reflection surface to form a central connecting portion in the light distribution patterns for overhead sign by means of the reflection light (less light than the reflection light reflected on the first reflection surface and more light than the reflection light reflected on the second reflection surface). In this manner, the vehicle headlamp according to the second aspect of the present invention is capable of setting the entire light distribution patterns for overhead sign at a substantially uniform brightness, and visibility of an overhead sign is improved, making it possible to contribute to traffic safety.

DESCRIPTION OF THE PREFERRED EMBODIMENTS

Figure 7:
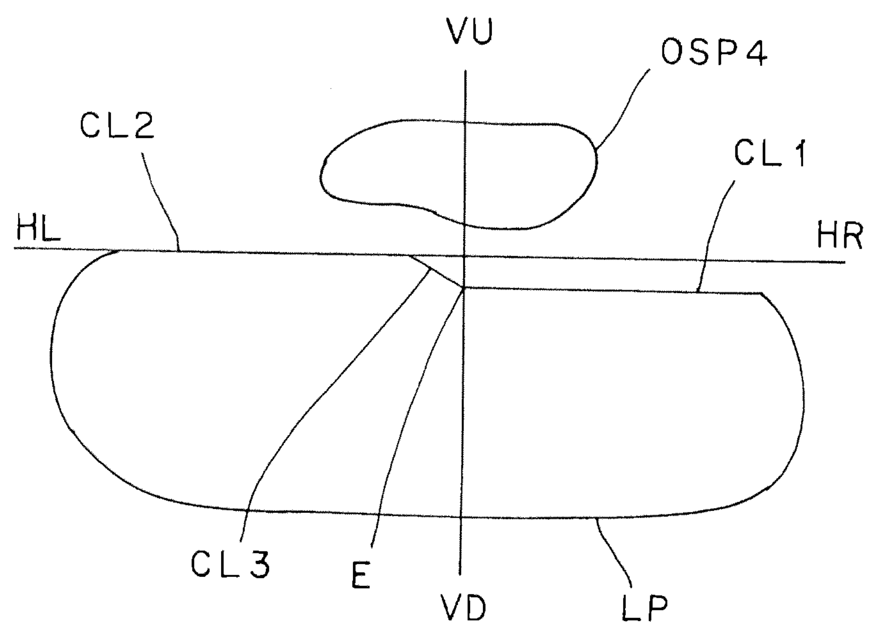
FIG. 7 is an explanatory view showing, on a screen, a light distribution pattern for overhead sign, which is formed by means of the flat reflection member shown in FIG. 6B.
Figure 8:
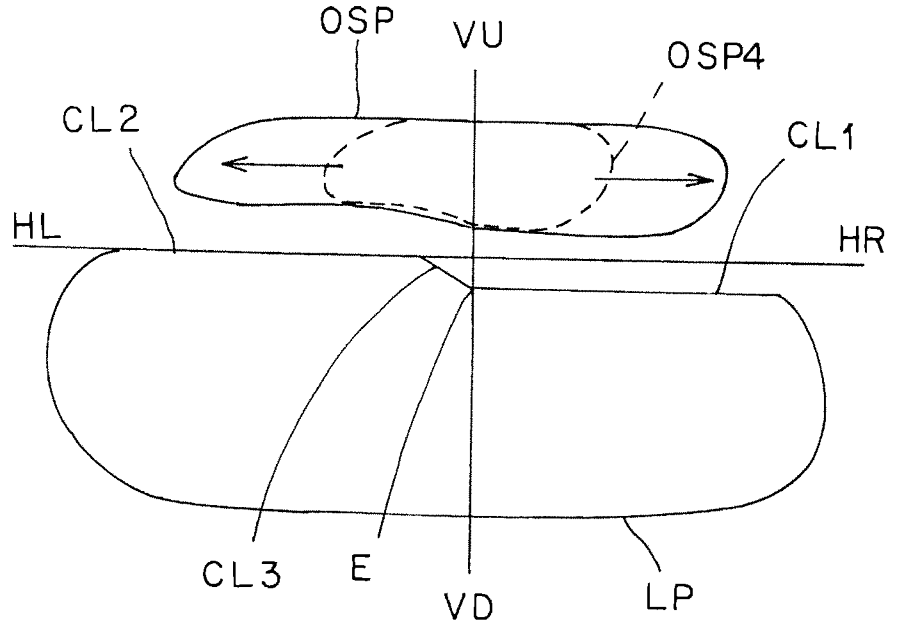
FIG. 8 is an explanatory view showing, on a screen, a transversely spread light distribution pattern for overhead sign, which is formed by means of the reflection member shown in FIG. 6A, similarly.
Figure 9:
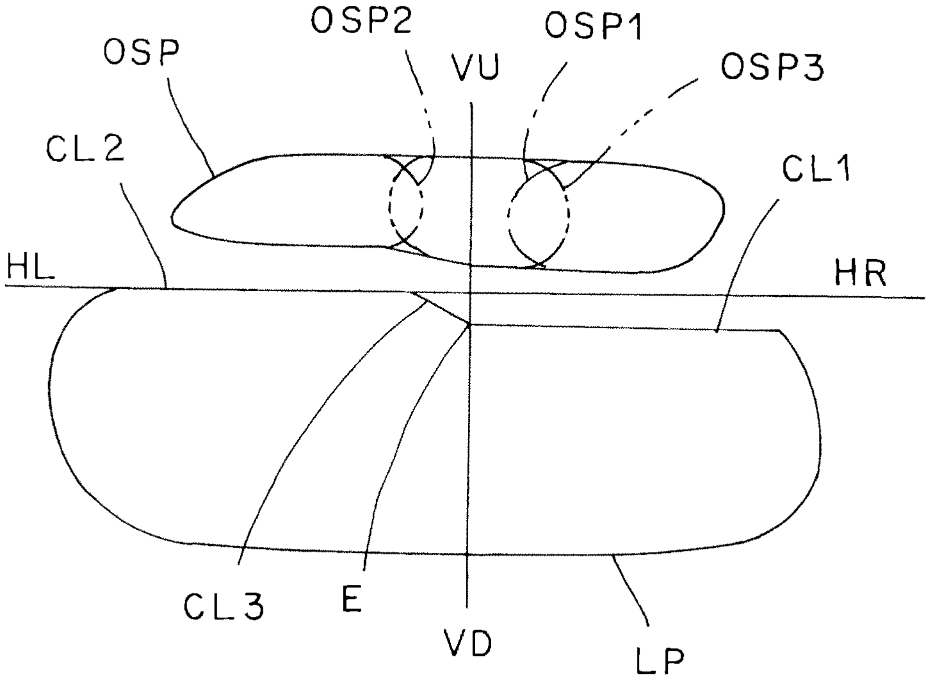
FIG. 9 is an explanatory view showing, on a screen, a distribution pattern for overhead sign with its uniform brightness, which is formed by means of the reflection member shown in FIG. 6A, similarly.

Hereinafter, two of the embodiments of a vehicle headlamp according to the present invention will be described in detail with reference to the drawings. It is to be noted that the present invention is not limited by these embodiments. In FIG. 7 to FIG. 9, reference sign "VU-VD" designates a horizontal line of the right and left of a screen. In addition, in the present specification or in the claims, the terms "top", "bottom", "front", "rear", "left", and "right" designate the "top", "bottom", "front", "rear", "left", and "right" when a vehicle is equipped with a vehicle lighting device according to the present invention.

First Embodiment

Description of Configuration

Figure 1:
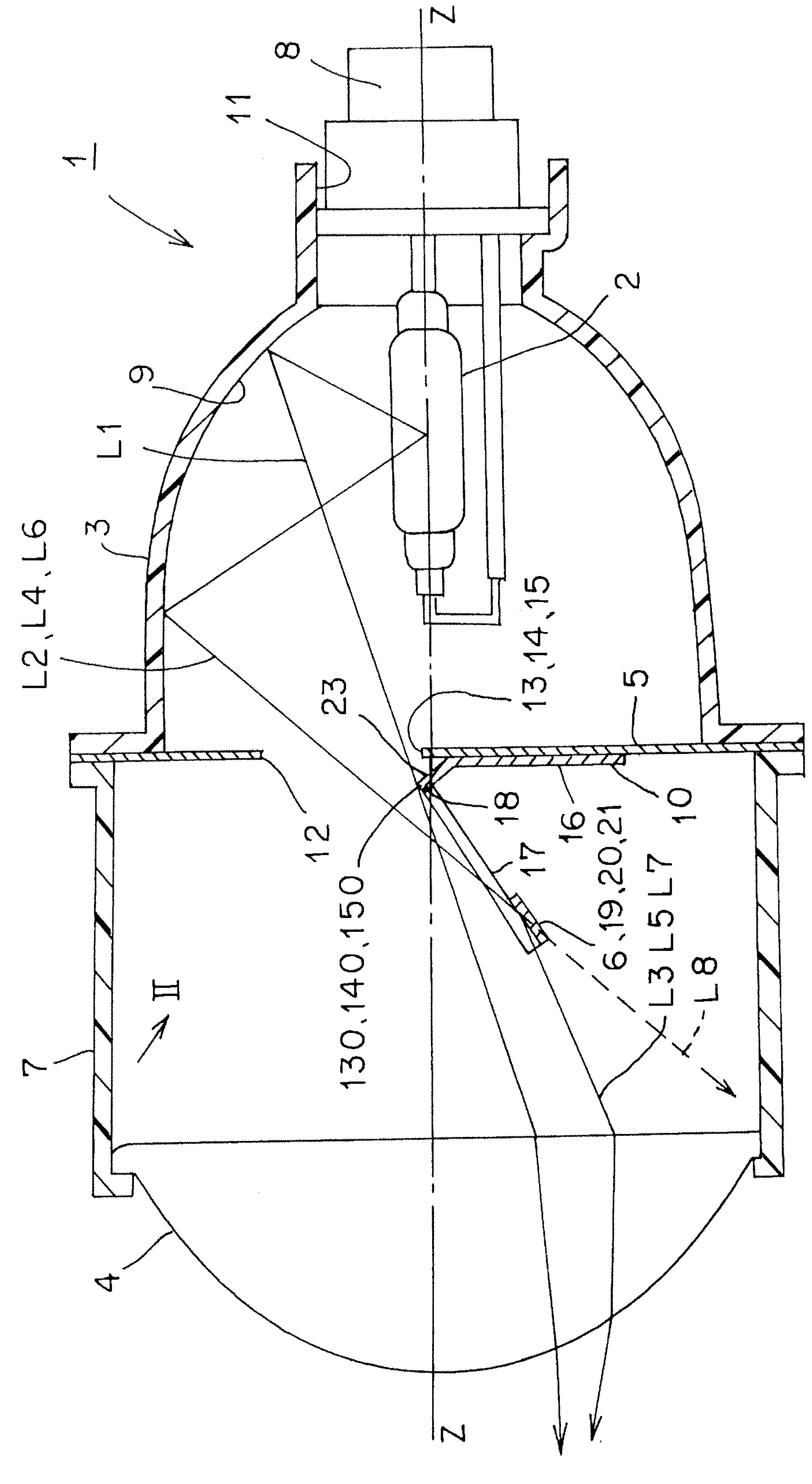
FIG. 1 is a longitudinal cross section (vertical cross section) showing a vehicle headlamp according to a first embodiment of the present invention.

FIG. 1 to FIG. 9 each show a vehicle headlamp according to a first embodiment of the present invention. Hereinafter, a configuration of the vehicle headlamp according to the first embodiment will be described. In FIG. 1, reference numeral 1 designates a vehicle headlamp of projection type according to the first embodiment (such as a headlamp or a fog lamp, for example). The vehicle headlamp 1 is equipped at a respective one of the right and left of a front part of an automobile (a vehicle). The vehicle headlamp 1 is a vehicle headlamp for left side passageway. FIG. 3A is a plan view of a shade and a reflection member, FIG. 3B is a front view of the shade and the reflection member, and FIG. 3C is a right side view of the shade and the reflection member.

The vehicle headlamp 1, as shown in FIG. 1, is provided with: a discharge lamp 2 serving as a light source; a reflector 3; a projection lens (a focusing lens and a convex lens) 4; a shade 5; a reflection member 6; a mount bracket 7 (a frame); a lamp housing (not shown); and a lamp lens (such as a transparent outer lens, for example), although not shown.

The discharge lamp 2, the reflector 3, the projection lens 4, the shade 5, the reflection member 6, and the mount bracket 7 constitute a projector lamp unit. The projector lamp unit is disposed via an optical axis adjustment mechanism (not shown), for example, in a lamp room (not shown) which is partitioned by the lamp housing and the lamp lens.

The discharge lamp 2 is a high voltage metal evaporation discharge lamp such as a metal halide lamp or a discharge lamp such as a high illumination discharge lamp (HID). The discharge lamp 2 is removably mounted on the reflector 3 via s socket 8. It is to be noted that a halogen electric bulb or an incandescent electric bulb may be used instead of the discharge lamp 2.

The reflector 3 opens on its front side (on the light emitting direction side of the vehicle headlamp 1), and is formed in a hollow recessed shape which is closed on its rear side. Aluminum evaporation or silver coating is applied to an internal recessed surface of the reflector 3, and a reflection surface 9 is formed. The reflection surface 9 is adapted to reflect light radiated from the discharge lamp 2 to the side of the shade 5, the reflection member 6, and the projection lens 4. The reflection surface 9 is an elliptical reflection surface. In other words, the reflection surface 9 is a reflection surface of a free curved surface (a NURBS-curved surface) in a state in which an ellipse is employed as a base (a reference or an underlying base).

Of a closed portion at a rear side of the reflector 3, a through hole 11 is provided at a site which an optical axis Z-Z of the reflection surface 9 crosses. In a state in which the discharge lamp 2 is inserted into the reflector 3 through the inside of the through hole 11, the socket 8 is removably mounted on an edge of the through hole 11. As a result, the discharge lamp 2 is removably mounted on the reflector 3 via the socket 8.

The projection lens 4 is a convex lens of a non-spherical lens. A front side of the projection lens 4 forms a protrusive non-spherical surface, whereas a rear side of the projection lens 4 forms a flat non-spherical surface (a flat surface). A lens axis of the projection lens 4 is coincident (substantially coincident) with the optical axis Z-Z of the reflection surface 9. The projection lens 4 forwardly projects reflection light from the reflection surface 9.

The shade 5 and the reflection member 6 are made of a plate member whose manufacturing cost is low (for example, a thin steel plate). The shade 5 and the reflection member 6 are fixed to each other by way of an appropriate fixing means (such as bolt nuts, screws, additional tightening, or welding). The shade 5 is formed in a plate shape covering the entire opening portion on a front side of the reflector 3. It is to be noted that in FIG. 2 and FIG. 3, the shade 5 is formed in a square shape without being limitative to such a square shape.

Figure 2:
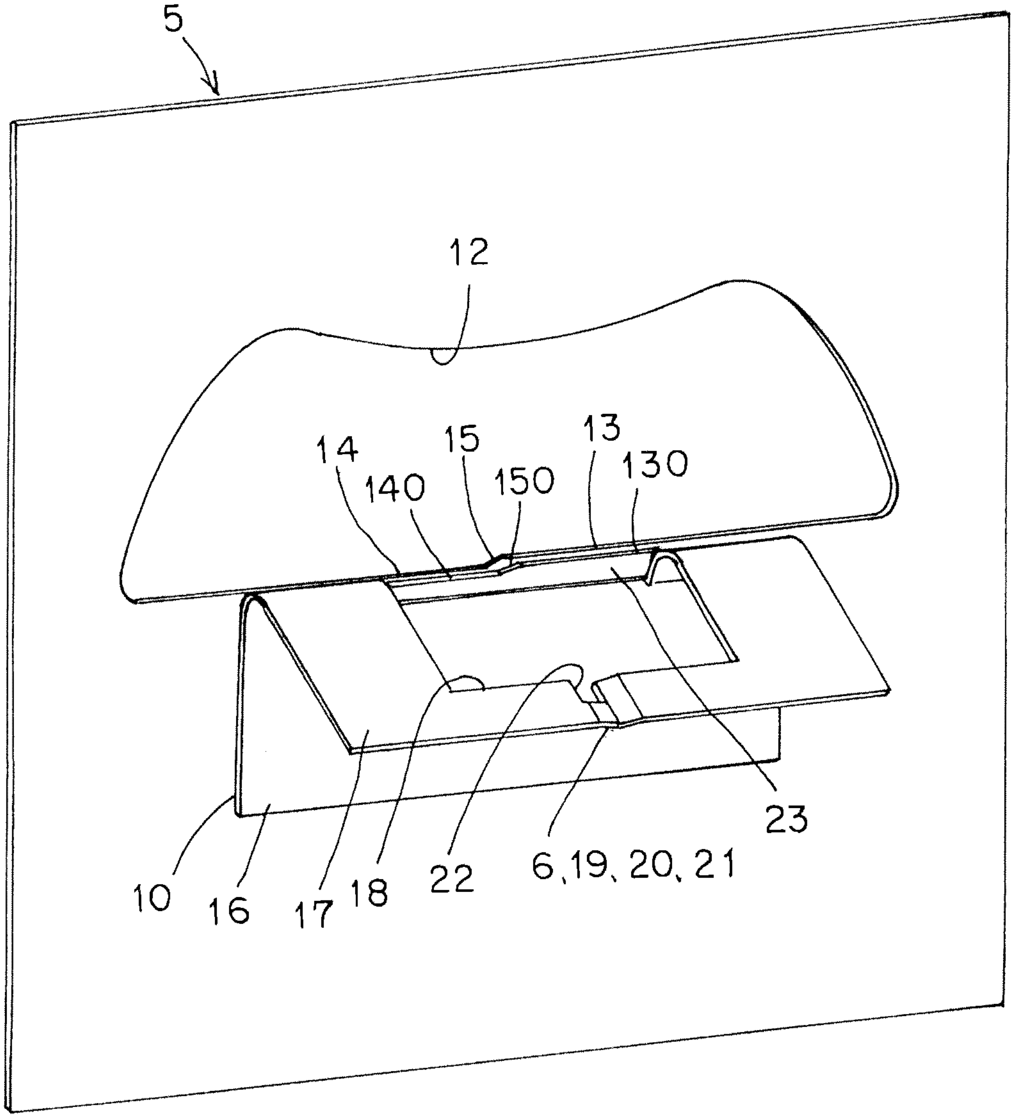
FIG. 2 is a perspective view of a shade and a reflection member, similarly (a view taken along the line II in FIG. 1)
Figure 3A:
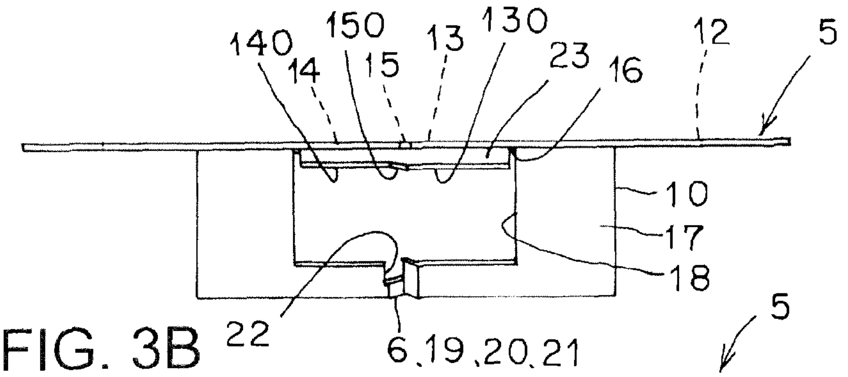
FIG. 3A, FIG. 3B, and FIG. 3C are explanatory views of the shade and the reflection member, similarly.
Figure 3B:
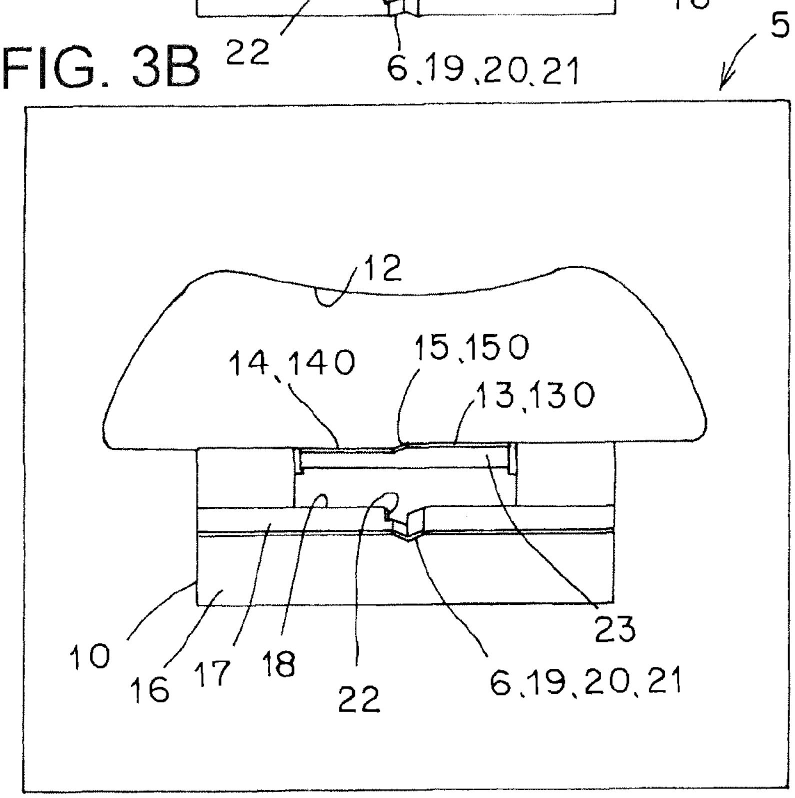
Figure 3C:
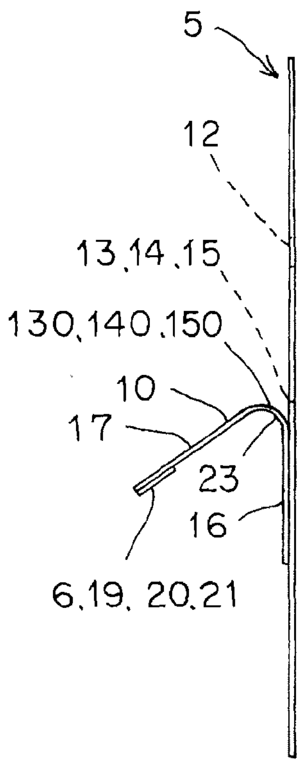

The shade 5 is disposed between the reflector 3 and the projection lens 4. As shown in FIG. 1 to FIG. 3, a window portion 12 that is formed in a transversely elongated rectangular shape (in a half-cocoon shape) is provided at a center part (from the center part to an upper part) of the shade 5. The shade 5 serves to shade part of the reflection light from the reflection surface 9 and then forms a light distribution pattern (hereinafter, referred to as a "a light distribution pattern for low beam") LP having cutoff lines CL1, CL2, and CL3 shown in FIG. 7 to FIG. 9 by means of a part L1 of the remaining reflection light, which has not shaded but passed through the window portion 12.

Edges 13, 14, and 15 that form the cutoff lines CL1, CL2, and CL3 of the light distribution pattern LP for low beam are provided at a lower side edge of the window portion 12. The edges constitute: a first horizontal edge (an upper horizontal edge) 13; a second horizontal edge (a lower horizontal edge) 14 which is positioned to be lower than the first horizontal edge 13; and a central oblique edge 15 between the first horizontal edge 13 and the second horizontal edge 14.

The first horizontal edge 13 forms a horizontal cutoff line (a lower horizontal cutoff line) CL1 on an opposite lane side. The second horizontal edge 14 forms a horizontal cutoff line (an upper horizontal cutoff line) CL2 on a cruising lane side. The central oblique edge 15 forms a central oblique cutoff line CL3. It is to be noted that in FIG. 7 to FIG. 9, reference alphabet "E" designates an elbow point. The window portion 12 forms the light distribution pattern LP for low beam.

The reflection member 6 is disposed between the projection lens 4 and the shade 5 via a fixing holding member 10. The reflection member 6 and the fixing holding member 10, as shown in FIG. 2 and FIG. 3, form an integrated structure in which a thin steel plate is bent in a V shape as seen from a lateral side. The fixing holding member 10 is made of: a vertical fixing portion 16 which is fixed at a site lower than the edges 13, 14, and 15 on a front face of the shade 5; and a holding portion 17 which is bent to an oblique lower side forward from a top end of the fixing portion 16 (in the V shape as seen from a lateral side). A square opening portion 18 is provided at a central part of the holding portion 17 of the fixing holding member 10. The reflection member 6 is integrally provided at a central part of an edge part on a front side of the opening portion 18 of the holding portion 17 of the fixing holding member 10.

At the reflection member 6, recessed reflection surfaces 19, 20, and 21 are provided for transversely spreading a light distribution pattern OSP for the overhead sign. The recessed reflection surface 19, 20, and 21 are formed in a shape recessed to its lower side in a V shape as seen from a front side. The aforementioned recessed reflection surface has a first recessed reflection surface 19, a second recessed reflection surface 20, and a third recessed reflection surface 21.

Figure 4:
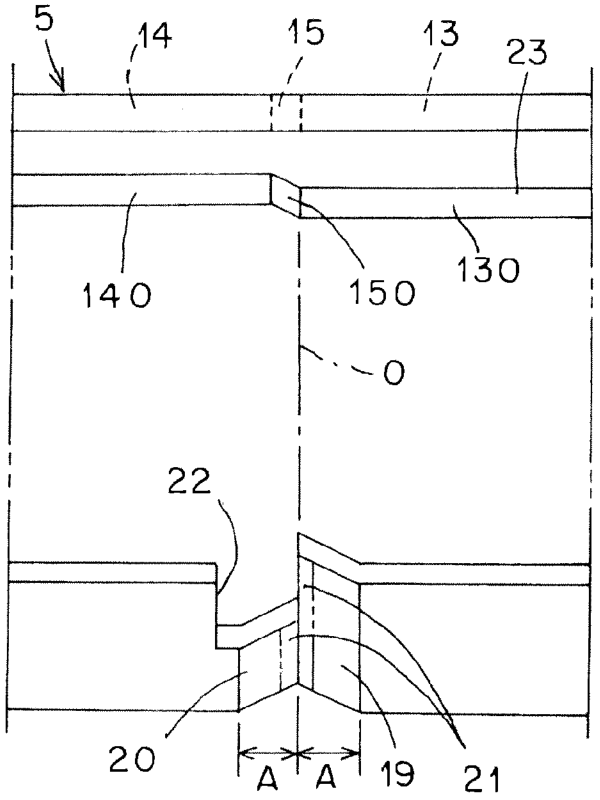
FIG. 4 is a partially enlarged plan view of the shade and the reflection member, similarly.
Figure 5:
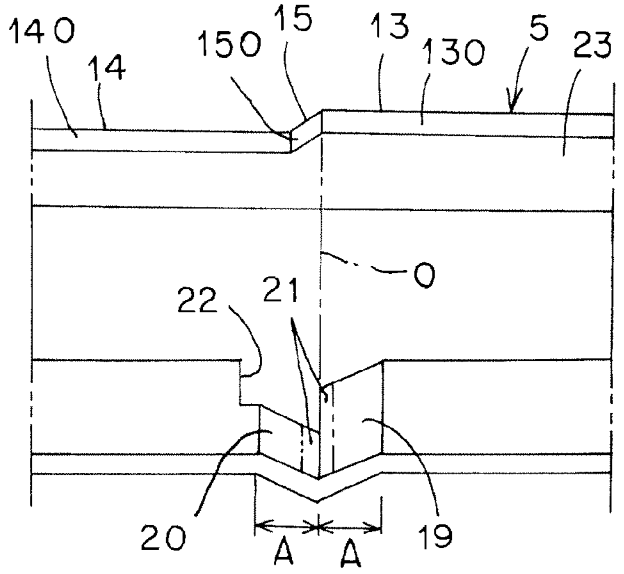
FIG. 5 is a partially enlarged plan view of the shade and the reflection member, similarly.

As shown in FIG. 4 and FIG. 5, the first recessed reflection surface 19 is made of a portion from a central part on one inclined face of the V shape (the portion indicated by the double-dotted chain line in FIG. 4 and FIG. 5) to a top part (an upper part). The second recessed reflection surface 20 is made of a portion from a central part on the other inclined face of the V shape (the portion indicated by the double-dotted chain line in FIG. 4 and FIG. 5) to a top part (an upper part). The third recessed reflection surface 21 is made of a portion from a central part on one inclined face of the V shape (the portion indicated by the double-dotted chain line in FIG. 4 and FIG. 5) to a central part on the other inclined face of the V shape (the portion indicated by the double-dotted chain line in FIG. 4 and FIG. 5) across a V-shaped valley.

Figure 6A:
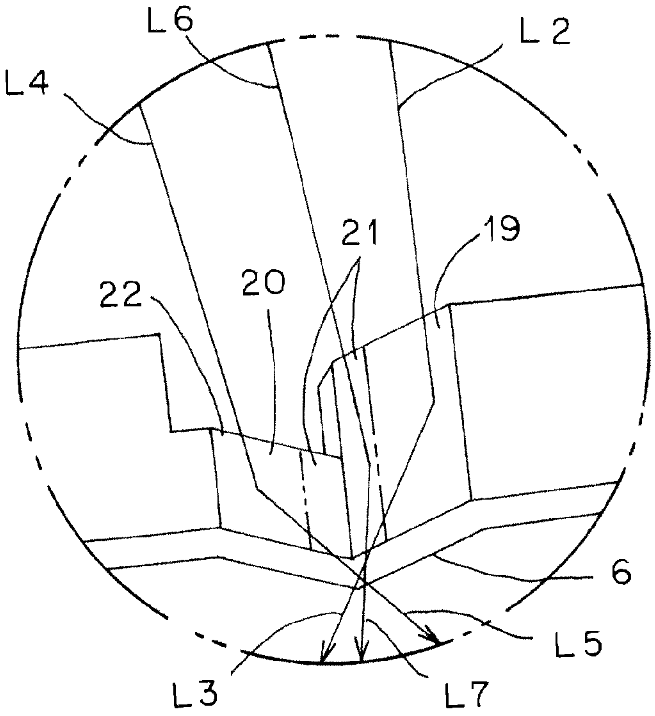
FIG. 6A and FIG. 6B are explanatory views showing reflection actions of a first recessed reflection surface, a second recessed reflection surface, and a third recessed reflection surface of the reflection member and a reflection action of a flat reflection member, similarly.

The first recessed reflection surface 19 is opposed to the first horizontal edge 13. The first recessed reflection surface 19, as shown in FIG. 1 and FIG. 6A, reflects the light L2 having passed through the window portion 12 on the side of the first horizontal edge 13 (the reflection light from the reflection surface 9 and part of the remaining reflection light that has not shaded by means of the shade 5 but passed through the window portion 12) and then forms, by means of the reflection light L3, the portion OSP1 (the portion indicated by the single-dotted chain line in FIG. 9) on an opposite lane side, of the light distribution pattern OSP for overhead sign, as shown in FIG. 9.

The second recessed reflection surface 20 is opposed to the second horizontal edge 14. The second recessed reflection surface 20, as shown in FIG. 1 and FIG. 6A, reflects the light L4 having passed through the window portion 12 on the side of the second horizontal edge 14 (the reflection light from the reflection surface 9 and part of the remaining reflection light that has not shaded by means of the shade 5 but passed through the window portion 12) and then forms, by means of the reflection light L5, the portion OSP2 (the portion indicated by the double-dotted chain line in FIG. 9) on a cruising lane side, of the light distribution pattern OSP for overhead sign, as shown in FIG. 9.

The third recessed reflection surface 21 is opposed to the central oblique edge 15. The third recessed reflection surface 21, as shown in FIG. 1 and FIG. 6A, reflects the light L6 having passed through the window portion 12 on the side of the central oblique edge 15 (the reflection light from the reflection surface 9 and part of the remaining reflection light that has not shaded by means of the shade 5 but passed through the window portion 12) and then forms, by means of the reflection light L7, a central connecting portion OSP3 (the portion indicated by the tripe-dotted chain line in FIG. 9) of the light distribution pattern OSP for overhead sign, as shown in FIG. 9.

Light beams L2, L4, and L6 that are incident to the recessed reflection surfaces 19, 20, and 21 are mainly reflection light beams from the reflection surface 9, and are light L8 which is not incident to the projection lens 4 (a so called ineffective light) of part of the remaining reflection light, which has not shaded but passed through the window portion 12.

An area of the second recessed reflection surface 20 is smaller than an area of the first recessed reflection surface 19. In other words, as shown in FIG. 4 and FIG. 5, the recessed reflection surfaces 19, 20, and 21 of the reflection member 6 are equal to each other in width A on the right and left inclined faces of the V shape with respect to a centerline O passing through the V-shaped valley. In addition, a width from the centerline O of the V-shaped valley on the third recessed reflection surface 21 to the central part on one inclined face of the V shape (the portion indicated by the double-dotted chain line in FIG. 4 and FIG. 5) is equal to a width from the centerline O of the V-shaped valley on the third recessed reflection surface 21 to the central part of the other inclined face of the V shape (the portion indicated by the double-dotted chain line in FIG. 4 and FIG. 5). In this manner, a width from the central part of one inclined face of the V shape on the first recessed reflection surface 19 (the portion indicated by the double-dotted chain line in FIG. 4 and FIG. 5) to the top part (the upper part) is equal to a width from the central part on the other inclined face of the V shape on the second recessed reflection surface 20 (the portion indicated by the double-dotted chain line in FIG. 4 and FIG. 5) to the top part (the upper part). A portion (a rear side portion) of the second recessed reflection surface 20 and the third recessed reflection surface 21 on the other inclined face of the V shape is cut out by means of a cutout 22. As a result, an area of the second recessed reflection surface 20 is smaller than an area of the first recessed reflection portion 19. The centerline O is a segment of line passing through a crossing point (a line-crossing point) between the first horizontal edge 13 and the central oblique edge 15 that form the elbow point E of the light distribution pattern LP for low beam.

A subsidiary shade 23 is provided at a site which is proximal to the edges 13, 14, and 15 on a front side of the shade 5. The subsidiary shade 23 forms an integrated structure with the fixing holding member 10 which is an integrated structure with the reflection member 6. At an upper edge of the subsidiary shade 23, edges 130, 140, and 150 for forming the cutoff lines CL1, CL2, and CL3 of the light distribution pattern LP for low beam are provided corresponding to the edges 13, 14, and 15 of the shade 5. An action for eliminating colors in the proximity of the cutoff lines CL1, CL2, and CL3 of the light distribution pattern LP for low beam is formed by means of double edges of the edges 13, 14, and 15 of the shade 5 and the edges 130, 140, and 150 of the subsidiary shade 23.

The reflector 3 to which the discharge lamp 2 is removably mounted via the socket 8, the projection lens 4, and the shade 5 to which the reflection member 6 is fixed are respectively fixed to and held on the mount bracket 7. The mount bracket 7 is mounted on the lamp housing via the optical axis adjustment mechanism.

(Description of Functions)

The vehicle headlamp 1 in the first embodiment is made of the constituent elements described above, and hereinafter, its related functions will be described.

A discharge lamp 2 of a projector lamp unit is turned on. The light that is radiated from the discharge lamp 2 is then reflected to the side of the shade 5, the reflection member 6, and the projection lens 4 by means of the reflection surface 9 of the reflector 3.

Part of the reflection light from the reflection surface 9 (not shown) is then shaded by means of the shade 5. On the other hand, as shown in FIG. 1, a major portion L1 of the reflection light from the reflection surface 9, which has not shaded by means of the shade 5 but passed through the window portion 12 of the shade 5, transmits the projection lens 4, and is emitted forward of a vehicle while forming a light distribution pattern LP for low beam, the pattern having the cutoff lines CL1, CL2, and CL3 shown in FIG. 7 to FIG. 9.

In addition, as shown in FIG. 1 and FIG. 6A, parts L2, L4, and L6 of the reflection light from the reflection surface 9, which has not shaded by means of the shade 5 but passed through the window portion 12 of the shade 5, are reflected to the side of the projection lens 4 by means of the recessed reflection surfaces 19, 20, and 21 of the reflection member 6, and the reflection light beams L3, L5, and L7 transmits the projection lens 4 and then are emitted forward of a vehicle while forming a light distribution pattern OSP for overhead sign, shown in FIG. 8 and FIG. 9, in a state in which the pattern is transversely spread.

In other words, the first recessed reflection surface 19, as shown in FIG. 1 and FIG. 6A, reflects light L2 having passed through the window portion 12 on the side of the first horizontal edges 13 and 130 and then forms, by means of the reflection light L3, a portion OSP1 on the opposite Lane side, of the light distribution pattern OSP for overhead sign, as is indicated by the single-dotted chain line in FIG. 9.

The second recessed reflection surface 20, as shown in FIG. 1 and FIG. 6A, reflects light L4 having passed through the window portion 12 on the side of the second horizontal edges 14 and 140 and then forms, by means of the reflection light L5, a portion OSP2 on the cruising lane side, of the light distribution pattern OSP for overhead sign, as is indicated by the double-dotted chain line in FIG. 9.

The third recessed reflection surface 21, as shown in FIG. 1 and FIG. 6A, reflects light L6 having passed through the window portion 12 on the side of the central oblique edges 15 and 150 and then forms, by means of the reflection light L7, a central connecting portion OSP3 of the light distribution pattern OSP for overhead sign, as is indicated by the triple-dotted chain line in FIG. 9.

(Description of Advantageous Effects)

The vehicle headlamp 1 in the first embodiment is made of the constituent elements and functions as described above, and hereinafter, its related advantageous effects will be described.

The vehicle headlamp 1 in the first embodiment is capable of transversely spreading the light distribution pattern OSP (OSP1, OSP2, or OSP3) for overhead sign by means of the recessed reflection surfaces 19, 20, and 21 of the reflection member 6, thus making it possible to control light distribution so that light is distributed to a predetermined point.

Figure 6B:
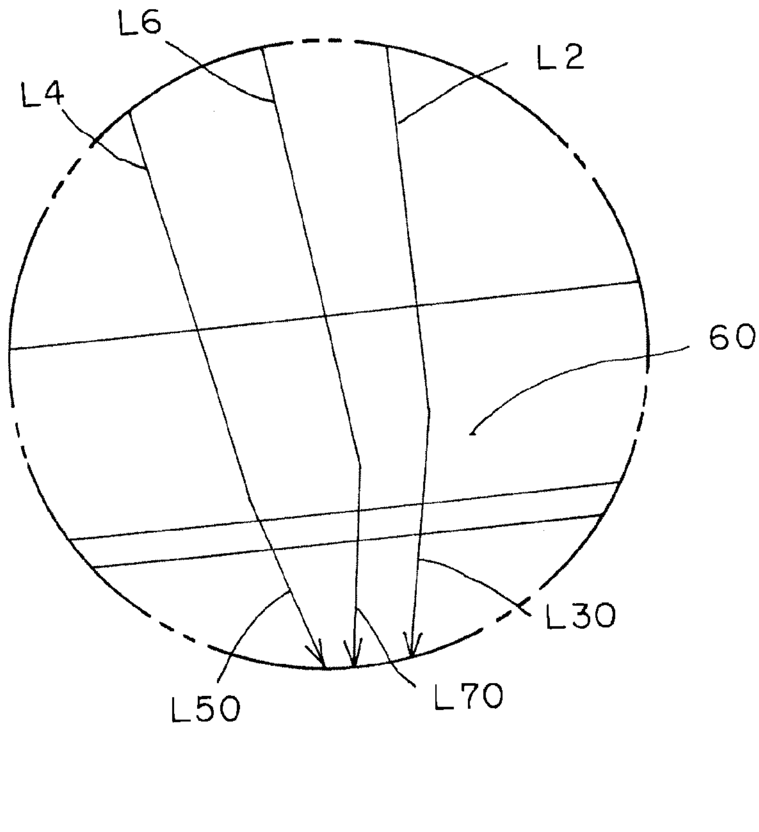

In the case of a flat reflection member 60 shown in FIG. 6B, for example, reflection light beams L30, L50, and L70 obtained upon reflection of the reflection light beams L2, L4, and L6 having passed through the window portion 12 gather to a center without transversely spreading. Thus, as shown in FIG. 7, a light distribution pattern OSP4 for overhead sign, which is formed by the reflection light beams 30, 50, and 70 reflected by means of the flat reflection member 60, does not transversely spread, making it difficult to control light distribution so that the light is distributed to a predetermined point.

On the other hand, according to the vehicle headlamp 1 in the first embodiment, as shown in FIG. 6A, the reflection light beams L2, L4, and L6 having passed through the window portion 12 are reflected as the transversely spread reflection light beams L3, L5, and L7, by means of the recessed reflection surfaces 19, 20, and 21 of the reflection member 6 that is formed in a shape recessed to its lower side in the V shape as seen from a front side. As a result, the vehicle headlamp 1 in the first embodiment, as shown in FIG. 8, is capable of forming the light distribution pattern OSP (OSP1, OSP2, or OSP3) for overhead sign, which is spread more transversely than the light distribution pattern OSP4 for overhead sign, which is formed by the flat reflection member 60 (the light distribution pattern indicated by the dotted line in FIG. 8).

According to the vehicle headlamp 1 in the first embodiment, an area of the second recessed reflection surface 20 is smaller than an area of the first recessed reflection surface 19. Therefore, the reflection light L5 to be reflected on the cruising lane side by means of the second recessed reflection surface 20 after having passed through the window portion 12 on the side of the second horizontal edges 14 and 140 is less than the reflection light L3 to be reflected on the opposite lane side by means of the first recessed reflection surface 19 after having passed through the window portion 12 on the side of the first horizontal edges 13 and 130. However, the second horizontal edges 14 and 140 are positioned to be lower than the first horizontal edges 13 and 130; and therefore, the light L4 having passed through the window portion 12 on the side of the second horizontal edges 14 and 140 is more than the light L2 having passed through the window portion 12 on the side of the first horizontal edges 13 and 130. As a result, according to the vehicle headlamp 1 in the first embodiment, as shown in FIG. 9, the light L2 having passed through the window portion 12 on the side of the first horizontal edges 13 and 130 (less light than the light 4 having passed through the window portion 12 on the side of the second horizontal edges 14 and 140) is reflected by means of the first recessed reflection surface 19 and then the portion OSP1 on the opposite lane side, of the light distribution pattern OSP for overhead sign, is formed by means of the reflection light L3 (more reflection light than the reflection light L5 that is reflected by means of the second reflection surface 20). On the other hand, the light L4 having passed through the window portion 12 on the side of the second horizontal edges 14 and 140 (more light than the light L2 having passed through the window portion 12 on the side of the first horizontal edges 13 and 130) is reflected by means of the second recessed reflection surface 20 and then the portion OSP2 on the cruising lane side, of the light distribution pattern OSP for overhead sign, is formed by means of the reflection light L5 (less reflection light than the reflection light L3 that is reflected by means of the first reflection surface 19), and the light L6 having passed through the window portion 12 on the side of the central oblique edges 15 and 150 (more light than the light L2 having passed through the window portion 12 on the side of the first horizontal edges 13 and 130 and less light than the light L4 having passed through the window portion 12 on the side of the second horizontal edges 14 and 140) is reflected by means of the third recessed reflection surface 21 and then the central connecting portion OSP3 of the light distribution pattern OSP for overhead sign is formed by means of the reflection light L7 (less reflection light than the reflection light L3 that is reflected by means of the first reflection surface 19 and more reflection light than the reflection light L5 that is reflected by means of the second reflection surface 20). In this manner, the vehicle headlamp 1 in the first embodiment is capable of setting the entire light distribution pattern OSP (OSP1, OSP2, or OSP3) for overhead sign at a substantially uniform brightness, and visibility of overhead sign OSP (OSP1, OSP2, or OSP3) is improved, making it possible to contribute to traffic safety.

According to the vehicle headlamp 1 in the first embodiment, light L8 that is mainly reflection light from the reflection surface 9, and which is not incident to the projection lens 4 (a so called invalid light) of part of the remaining reflection light that is not shaded but having passed through the window portion 12, is effectively utilized as the light beams L2, L4, and L6 that are incident to the recessed reflection surfaces 19, 20, and 21.

Second Embodiment

Description of Second Embodiment

Figure 10A:
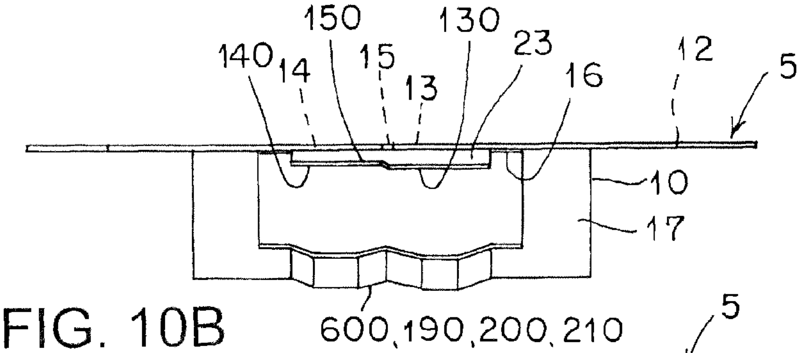
FIG. 10A, FIG. 10B, and FIG. 10C are explanatory views of a shade and a reflection member shown in a vehicle headlamp according to a second embodiment of the present invention.
Figure 10B:
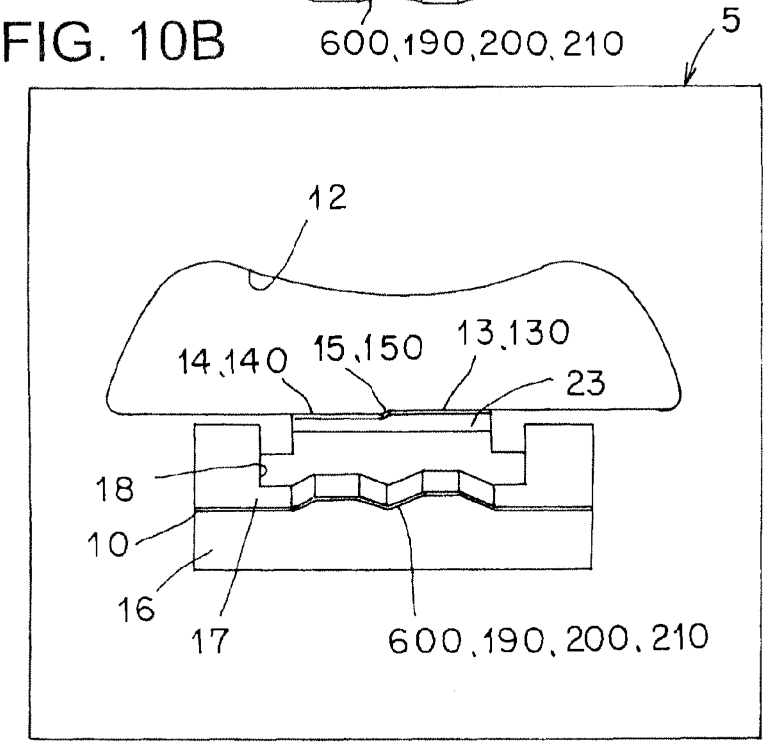
Figure 10C:
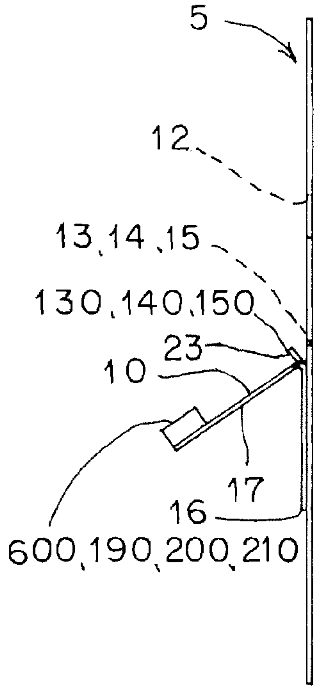
Figure 11:
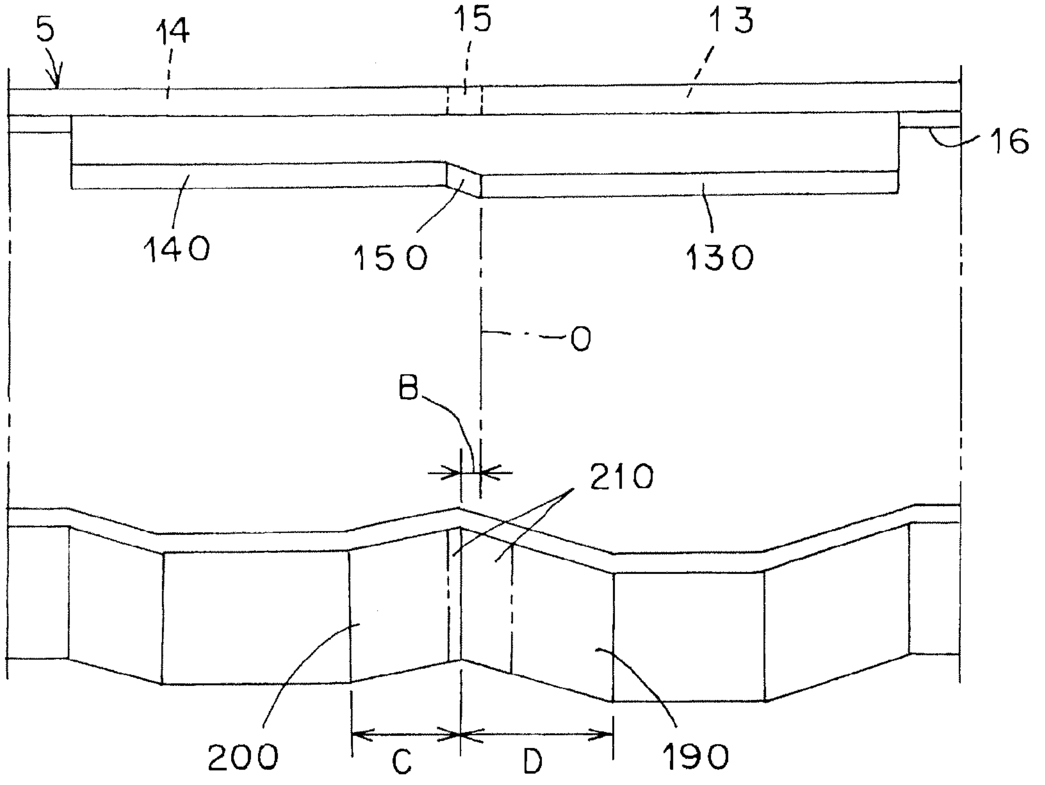
FIG. 11 is a partially enlarged plan view of the shade and the reflection member, similarly.
Figure 12:
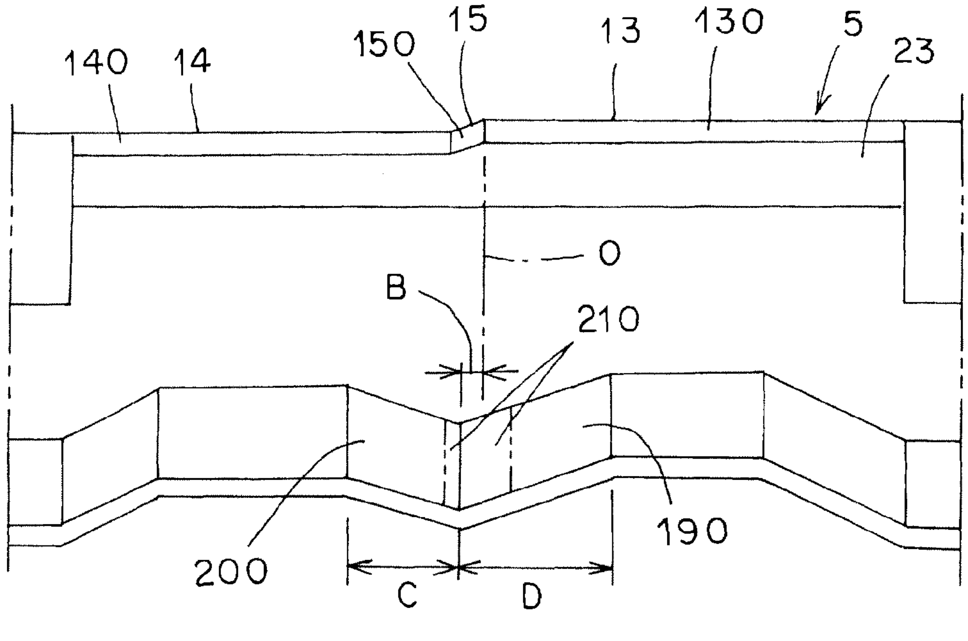
FIG. 12 is a partially enlarged plan view of the shade and the reflection member, similarly.

FIG. 10 to FIG. 12 each show a vehicle headlamp according to a second embodiment of the present invention. Hereinafter, the vehicle headlamp in the second embodiment will be described. In the figures, like constituent elements are designated by like reference numerals assigned in FIG. 1 to FIG. 9.

According to the aforementioned vehicle headlamp 1 of the first embodiment, an area of the second recessed reflection surface 20 of the reflection member 6 is smaller than an area of the first recessed reflection surface 19 by means of a cutout 22. On the other hand, according to a vehicle headlamp of the second embodiment, a V-shaped valley is shifted (offset) by a width B to the side of the second horizontal edges 14 and 140 and the central oblique edges 15 and 150 with respect to the centerline O, and a width C on the side of a second recessed reflection surface 200 of a reflection member 600 is smaller than a width D on the side of a first recessed reflection surface 190. In this manner, an area on the side of the second recessed reflection surface 200 of the reflection member 600 is smaller than an area on the side of the first recessed reflection surface 190. It is to be noted that in FIG. 10 to FIG. 12, reference numeral "210" designates a third recessed reflection surface.

The vehicle headlamp of the second embodiment is made of the constituent elements as described above, thus making it possible to achieve functions and advantageous effects which are substantially similar to those of the aforementioned vehicle headlamp 1 of the first embodiment.

Description of Modification Examples of First Embodiment

Figure 13A:
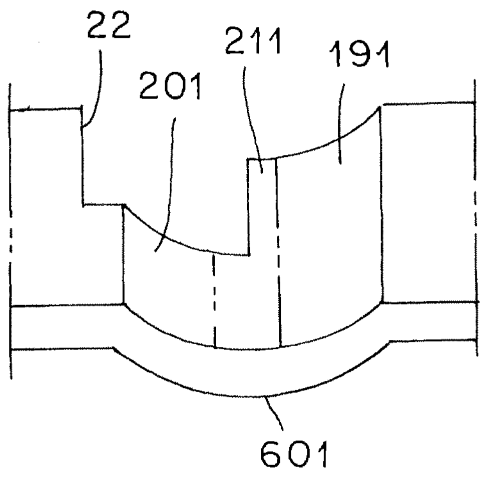
FIG. 13A, FIG. 13B, and FIG. 13C are explanatory views showing modification examples of a first recessed reflection surface, a second recessed reflection surface, and a third recessed reflection surface of the reflection member.
Figure 13B:
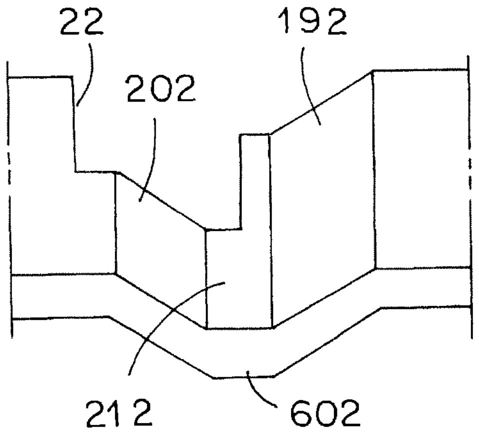
Figure 13C:
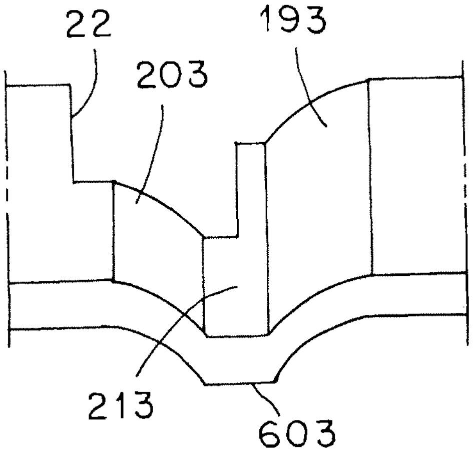

FIG. 13A, FIG. 13B, and FIG. 13C each show a modification example of the vehicle headlamp according to the first embodiment of the present invention. Hereinafter, the vehicle headlamp in the modification examples of the first embodiment will be described. In the figure, like constituent elements are designated by like reference numerals assigned in FIG. 1 to FIG. 9.

According to the aforementioned vehicle headlamp 1 of the first embodiment, the recessed reflection surfaces 19, 20, and 21 of the reflection member 6 are formed in a shape recessed to its lower side in the V shape as seen from a front side. Recessed reflection surfaces 191, 201, and 211 of a reflection member 601 shown in FIG. 13A is formed in a shape recessed to its lower side in the U shape as seen from a front side. Recessed reflection surfaces 192, 202, and 212 of a reflection member 602 shown in FIG. 13B are formed in a shape recessed to its lower side in an inverted trapezoidal shape as seen from a front side. Recessed reflection surfaces 193, 203, and 213 of a reflection member 603 shown in FIG. 13C are formed in a shape recessed to its lower side in an inverted trapezoidal shape in which each of the right and left inclined faces is inwardly curved as seen from a front side.

Description of Examples Other than First and Second Embodiments and Modification Examples The aforementioned first and second embodiments and modification examples each show a vehicle headlamp for left side passageway. In the case of a vehicle headlamp for right side passageway, a shade and edges of the shade, light distribution patterns for low beam, cutoff lines of a light distribution pattern LP for low beam, and light distribution patterns for overhead sign are transversely inverted (reversed).

What is claimed is:

1. A vehicle headlamp of projection type for emitting a light distribution pattern, which has a cutoff line, and a light distribution pattern for an overhead sign, forward of a vehicle, the vehicle headlamp comprising:

- a light source;
- a reflector having a reflection surface adapted to reflect light from the light source;
- a projection lens adapted to forwardly project reflection light from the reflection surface;
- a shade having a window portion, adapted to shade part of the reflection light from the reflection surface to thereby form the light distribution pattern having the cutoff line by remaining reflection light;
- a reflection member adapted to reflect part of the reflection light that is reflection light from the reflection surface of the reflector, the reflection light having passed through the window portion to thereby form the light distribution pattern for the overhead sign through the projection lens, and a fixing holding member comprising:

a vertical fixing portion fixed lower than at least one edge adapted to form the cutoff line and provided at the window portion of the shade, and a holding portion bent to an oblique side from a top end of the vertical fixing portion, wherein the reflection member is disposed between the projection lens and the shade via the fixing holding member, wherein the fixing holding member and the reflection member form an integrated structure having a V-shape, and wherein a recessed reflection surface is provided for transversely spreading the light distribution pattern for the overhead sign that is formed through the projection lens.

2. A vehicle headlamp of projection type for emitting a light distribution pattern, which has a cutoff line, and a light distribution pattern for an overhead sign, forward of a vehicle, the vehicle headlamp comprising:

a light source;

a reflector having a reflection surface adapted to reflect light from the light source;

a projection lens adapted to forwardly project reflection light from the reflection surface;

a shade having a window portion, adapted to shade part of the reflection light from the reflection surface to thereby form the light distribution pattern having the cutoff line by remaining reflection light; and a reflection member adapted to reflect part of the reflection light that is reflection light from the reflection surface of the reflector, the reflection light having passed through the window portion to thereby form the light distribution pattern for the overhead sign through the projection lens, wherein at least one edge adapted to form the cutoff line is provided at the window portion of the shade, wherein the reflection member is disposed between the projection lens and the shade, and wherein a recessed reflection surface is provided for transversely spreading the light distribution pattern for the overhead sign that is formed through the projection lens, wherein the at least one edge includes: a first horizontal edge adapted to form a horizontal cutoff line on an opposite lane side; a second horizontal edge which is positioned to be lower than the first horizontal edge, and is adapted to form a horizontal cutoff line on a cruising lane side; and a central oblique edge adapted to form a central oblique cutoff line, the recessed reflection surface is formed in a shape recessed to a lower side, and has: a first recessed reflection surface adapted to reflect light having passed through the window portion on a side of the first horizontal edge to thereby form a portion on the opposite lane side; a second recessed reflection surface adapted to reflect light having passed through the window portion on a side of the second horizontal edge to thereby form a portion on the cruising lane side; and a third recessed reflection surface adapted to reflect light having passed through the window portion on a side of the central oblique edge to thereby form a central connecting portion, and an area of the second recessed reflection surface is smaller than an area of the first recessed reflection surface.

* * * * *